US007228316B2

(12) United States Patent
Gutierrez et al.

(10) Patent No.: US 7,228,316 B2
(45) Date of Patent: *Jun. 5, 2007

(54) THREE-DIMENSIONAL VOLUMETRIC GEO-SPATIAL QUERYING

(75) Inventors: Guillermo E. Gutierrez, Melbourne, FL (US); Timothy B. Faulkner, Palm Bay, FL (US); Tahia Infantes Morris, Houston, TX (US)

(73) Assignee: Harris Corporation, Melbourne, FL (US)

( * ) Notice: Subject to any disclaimer, the term of this patent is extended or adjusted under 35 U.S.C. 154(b) by 484 days.

This patent is subject to a terminal disclaimer.

(21) Appl. No.: 10/873,509

(22) Filed: Jun. 21, 2004

(65) Prior Publication Data
US 2004/0230595 A1 Nov. 18, 2004

Related U.S. Application Data

(63) Continuation of application No. 10/109,391, filed on Mar. 28, 2002, now Pat. No. 6,915,310.

(51) Int. Cl.
*G06F 7/00* (2006.01)
(52) U.S. Cl. .................. 707/104.1; 707/100; 345/953; 382/240
(58) Field of Classification Search .............. 707/3, 707/100, 104.1; 715/764; 382/240, 284, 382/242; 701/200; 709/203
See application file for complete search history.

(56) References Cited

U.S. PATENT DOCUMENTS

| 5,528,518 | A | 6/1996 | Bradshaw et al. |
| 5,808,916 | A | 9/1998 | Orr et al. |
| 5,873,056 | A | 2/1999 | Liddy |
| 5,953,722 | A | 9/1999 | Lampert et al. |
| 5,968,109 | A | 10/1999 | Israni et al. |

(Continued)

FOREIGN PATENT DOCUMENTS

| WO | WO 01/41000 | 6/2001 |
| WO | WO 01/98925 | 12/2001 |

OTHER PUBLICATIONS

Harris Corporation, "*RealSite™ Modeling Process*" [retrieved on: Feb. 18, 2002]. Retrieved from the Internet: <www.govcomm.harris.com/realsite/realiste.html>.

(Continued)

*Primary Examiner*—Sathyanarayan Pannala
(74) *Attorney, Agent, or Firm*—Sacco & Associates, PA; Robert J. Sacco

(57) ABSTRACT

A three-dimensional (3D) volumetric geo-spatial querying system. The system can include a 3D GIS. The 3D GIS can include a database of geo-spatial data configured to store geo-spatial data using, not two-dimensional, but three-dimensional coordinates. The GIS further can include at least one database operation configured to process a database query against geo-spatial data stored in the database. Notably, the database operation can accept three-dimensional coordinates as part of the database query. Importantly, the 3D GIS can include a geo-spatial data encoder configured to encode the geo-spatial data prior to storing the geo-spatial data in the database. In particular, in one aspect of the present invention, the encoder can be a helical hyperspatial code encoder, or an oct-tree encoder.

9 Claims, 2 Drawing Sheets

U.S. PATENT DOCUMENTS

| | | | |
|---|---|---|---|
| 5,971,595 | A | 10/1999 | Grant et al. |
| 5,974,419 | A | 10/1999 | Ashby |
| 6,081,624 | A | 6/2000 | Krishnaswamy |
| 6,161,105 | A * | 12/2000 | Keighan et al. ............ 707/100 |
| 6,173,287 | B1 | 1/2001 | Eberman |
| 6,195,122 | B1 | 2/2001 | Vincent |
| 6,222,482 | B1 | 4/2001 | Gueziec |
| 6,253,239 | B1 | 6/2001 | Shklar et al. |
| 6,282,362 | B1 | 8/2001 | Murphy et al. |
| 6,285,805 | B1 | 9/2001 | Gueziec |
| 6,292,215 | B1 | 9/2001 | Vincent |
| 6,304,864 | B1 | 10/2001 | Liddy et al. |
| 6,307,573 | B1 * | 10/2001 | Barros ....................... 715/764 |
| 6,360,234 | B2 | 3/2002 | Jain et al. |
| 6,445,983 | B1 | 9/2002 | Dickson et al. |
| 6,463,180 | B1 * | 10/2002 | Krishnaswamy ............ 382/240 |
| 6,516,099 | B1 * | 2/2003 | Davison et al. ............. 382/284 |
| 6,567,980 | B1 | 5/2003 | Jain et al. |
| 6,597,818 | B2 | 7/2003 | Kumar et al. |
| 6,681,231 | B1 | 1/2004 | Burnett |
| 7,072,764 | B2 * | 7/2006 | Donath et al. ............... 701/200 |
| 7,139,794 | B2 * | 11/2006 | Levanon et al. ............ 709/203 |
| 2001/0038718 | A1 | 11/2001 | Kumar et al. |
| 2002/0035451 | A1 | 3/2002 | Rothermel |
| 2002/0055924 | A1 | 5/2002 | Liming |
| 2002/0118224 | A1 | 8/2002 | Levanon et al. |
| 2002/0169549 | A1 | 11/2002 | Kaplan |
| 2002/0183072 | A1 | 12/2002 | Steinbach et al. |
| 2003/0050927 | A1 | 3/2003 | Hussam |
| 2004/0008866 | A1 | 1/2004 | Rhoads et al. |

OTHER PUBLICATIONS

Harris Corporation, "*Government Communications Systems*" [retrieved on: Feb. 18, 2002]. Retrieved from the Internet: <www.govcomm.harris.com/realsite/Flyer1_back.jpg>.

Harris Corporation, "*RealSite™ 3D Urban Models and InReality™ Model Viewer*", [retrieved on: Feb. 18, 2002]. Retrieved from the Internet: <www.govcomm.harris.com/realiste/index.html>.

Scott, Michael S., ABD; "*The Extension of Cartographic Modeling for Volumetric Geographic Analysis*" [retrieved on: Sep. 21, 2004]. Retrieved from the Internet: <www.spatial.maine.edu/ucgis/testproc/scott_m/scottm.html>.

U.S. Department of the Interior, U.S. Geological Survey, Reston, VA, "*Geographic Information Systems*" [retrieved on: Feb. 17, 2002]. Retrieved from the Internet:<www.usgs.gov/research/gis/title.html>.

U.S. Department of the Interior, U.S. Geological Survey, Reston, VA, "*Graphic display techniques*" [retrieved on: Feb. 17, 2002]. Retrieved from the Internet: <www.usgs.gov/research/gis/application6.html>.

Oracle Corporation, "*Orcale Spatial Option Location-Based Services Oracle9i*" [retrieved on: Sep. 21, 2004]. Retrieved from the Internet: <http://www.oracle.com/technology/products/oracle9i/datasheets/spatial.html>.

Swanson, James; "*The Three Dimensional Visualization and Analysis of Geographic Data*" [retrieved on: Feb. 17, 2002]. Retrieved from the Internet: <http://maps.unomaha.edu.Peterson/gis/Final_Projects/1996/Swanson/GIS_Paper.html>.

Kofler, et al., "R-trees for organizing and visualizing 3D GIS databases" Journal of Visualization and Comupiter Animation, vol. 11, No. 3, Jul. 2000 pp. 129-143, XP002338630.

Lee, et al., "Development of 3-dimensional GIS running on Internet" Geoscience and Remote Sensing Symposium Proceedings, 1998, IGARSS '98. 1998 IEEE International Seattle, WA, USA Jul. 6-10, 1998, New York, NY, USA, IEEE, US, vol. 2, Jul. 6, 1998, pp. 1046-1049, XP010293127.

Van Oosterom, et al., "Integrated 3D modelling within a GIS", Revised Paper for AGDM '94, Sep. 14, 1994, pp. 1-16, X002412798, The Netherlands.

* cited by examiner

THREE-DIMENSIONAL VOLUMETRIC GEO-SPATIAL QUERYING

CROSS REFERENCE TO RELATED APPLICATIONS

This application is a continuation of U.S. application Ser. No. 10/109,391 filed on Mar. 28, 2002 now U.S. Pat. No. 6,915,310.

BACKGROUND OF THE INVENTION

1. Statement of the Technical Field

The present invention relates to the field of geographic information systems (GIS) technology and more particular to the three-dimensional visualization and analysis of geographic data.

2. Description of the Related Art

Traditional maps represent abstractions of real world locations. Specifically, traditional maps are based upon discrete samples of location-based elements. The discrete samples can be applied to two-dimensional print to provide a visual representation of a real world location, whether symbolically, illustratively, or otherwise. End-users who use maps interpret the two-dimensional visual representation to facilitate a geographical analysis. Still, as the comfortable reach of the two-dimensional map can suffice for many applications, to model reality most clearly, a three-dimensional (3D) map can prove most advantageous.

GIS technology includes computer systems configured to assemble, store, manipulate and display geographically referenced information. Most conventional GIS technologies process data identified according to two-dimensional spatial references. Still, conventional GIS technologies can be configured to process topographic data, in addition to rudimentary two-dimensional data, usually in the form of a digital elevation model. Based upon the topographic data, isometric views and contour maps can be generated. GIS users, however, have recognized the limitations of a two-dimensional modeling paradigm for modeling 3D phenomena, even when combined with topographic data.

Notably, some GIS technologies can integrate scene generation systems for the 3D visualization of data. Yet, although z-axis coordinate data now can be easily recorded or can be made readily available for the visualization of surface features, this 3D aspect of GIS data historically has been disregarded in conventional GIS software. Rather, in conventional GIS technologies, z-axis coordinate data has been included only to "drape" a two-dimensional mapping over topographic data to produce what is known as a 2.5D model. Still, the use of a 2.5D model ought not to be confused with 3D GIS. Rather, to be properly characterized as a 3D GIS, GIS technology must be able to handle geographic data as a volumetric object rather than as merely a two-dimensional surface.

Presently, fully functional 3D, volumetric GIS technologies do not exist. In fact, most conventional GIS technologies permit end-users to locate objects given only two-dimensional geo-spatial coordinates. In particular, database systems have been developed in which two-dimensional spatial structures can be created, stored and managed. Examples of two-dimensional geo-spatial coordinates include an address, points on a map, and a latitude/longitude pair. Based upon these stored two-dimensional spatial structures, 3D visualization technologies are able to create and visualize 3D structures and sequences.

For example, U.S. Pat. No. 6,161,105 issued to Oracle Corporation on Dec. 12, 2000 (the "'105 patent") discloses one such database engine in which binary helical hyperspatial (HH) codes are used to represent multi-dimensional data in a relational database. In particular, the invention disclosed in the '105 patent supports three geometric primitive types and geometries formed from the primitive types. The three geometric primitive types are Point, Line String, and N-point Polygon. Importantly, however, each of the three geometric primitive types are defined merely in two dimensions. In particular, as explicitly stated in column 7, lines 39-44 of the '105 patent, "[T]he present invention's BH code data structure is modeled . . . in two dimensions . . . as a quad tree structure derviced using recursive decomposition." Accordingly, the database engine of the '105 patent cannot support pure, 3D volumetric geo-spatial queries.

Thus, the combination of database technologies with 3D visualization technologies cannot support purely 3D, volumetric, geo-spatial querying. In that regard, stored two-dimensional spatial structures and 3D visualization technologies cannot be combined to locate points, lines or objects which intersect a volume. Similarly, the combination of stored two-dimensional spatial structures and 3D visualization technologies cannot be used to identify objects which exist within other 3D objects. Hence, the remains a need for a system which can support purely 3D, volumetric, geo-spatial querying.

SUMMARY OF THE INVENTION

The present invention is a three-dimensional (3D) volumetric geo-spatial querying system which overcomes the two-dimensional limitations of the prior art and includes a 3D GIS which can include a database of geo-spatial data configured to store geo-spatial data using, not two-dimensional, but three-dimensional coordinates. The GIS further can include at least one database operation configured to process a database query against geo-spatial data stored in the database. Notably, the database operation can accept three-dimensional coordinates as part of the database query. Also, the database operation can be further configured to return a three-dimensional query result based upon the database query.

Importantly, the 3D GIS can include a geo-spatial data encoder configured to encode the geo-spatial data prior to storing the geo-spatial data in the database. In particular, in one aspect of the present invention, the encoder can be a helical hyperspatial code encoder. In another aspect of the present invention, the encoder can, include an oct-tree encoder. Finally, in yet another aspect of the present invention, a geography markup language (GML) formatter can be configured to format the query results using GML.

A method for configuring a 3D GIS, can include capturing three-dimensional geo-spatial data based upon imagery of a real-world location. In particular, the captured three-dimensional geo-spatial data can form a geo-spatially accurate model of the real-world location. The captured three-dimensional geo-spatial data can be encoded for storage in a database and, subsequently, the encoded three-dimensional geo-spatial data can be stored in the database. Finally, at least one database operation can be configured to execute a database query against the stored three-dimensional geo-spatial data based upon three-dimensional query input parameters.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a three-dimensional (3D) volumetric geo-spatial querying system. In accordance with the inventive arrangements, 3D geo-spatial data can be derived from imagery of a real-world location. Notably, the 3D geo-spatial data can be stored in a database of geo-spatial data using 3D primitives rather than two-dimensional primitives. Subsequently, 3D volumetric geo-spatial queries can be processed against the stored 3D geo-spatial data in the database without requiring an initial translation of two-dimensional primitives to conduct the query. Thus, by combining an altitude primitive with a latitudinal and longitudinal primitive in the database of geo-spatial data, pure 3D queries can be processed giving rise to an entirely new class of 3D visual realization applications.

Figure 1:
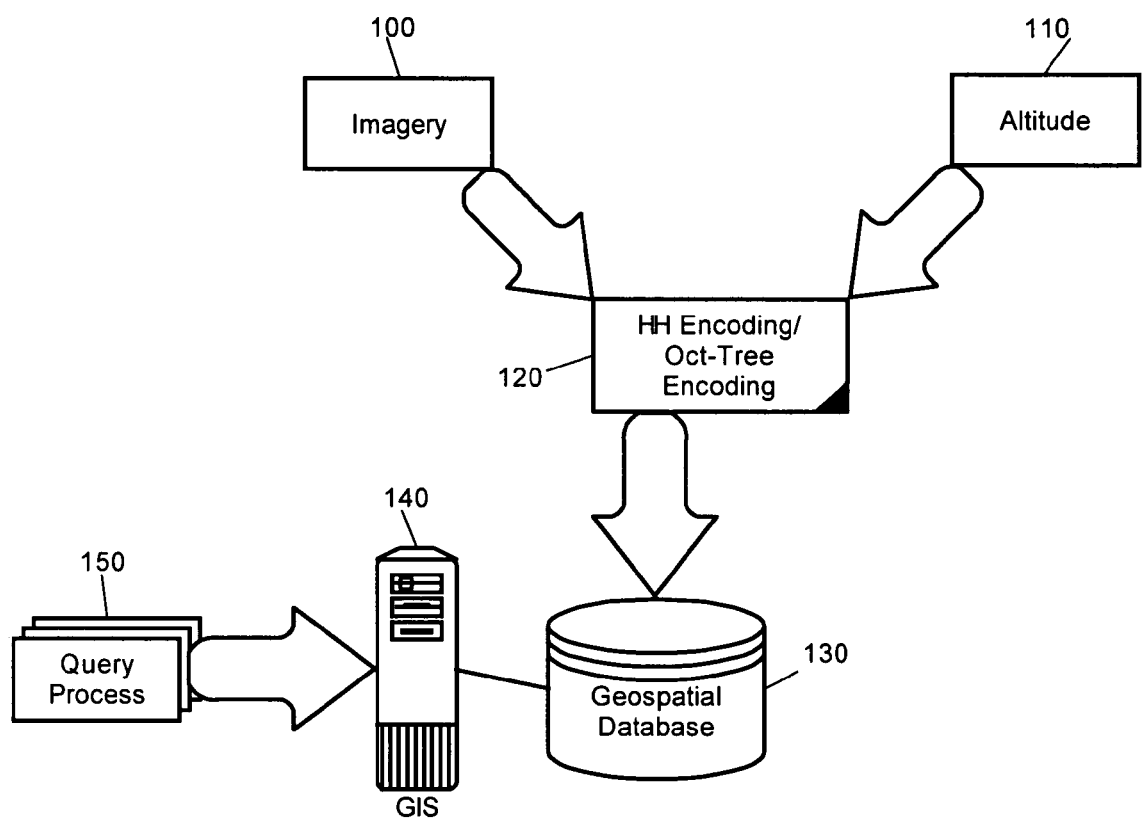
FIG. 1 is a block diagram illustrating a process for configuring a GIS system for three-dimensional volumetric geo-spatial querying; and, FIG. 2 is a schematic illustration of the operation of a GIS system which has been configured for three-dimensional volumetric geo-spatial querying.

FIG. 1 is a block illustration of the configuration and population of a geo-spatial database in a geographic information system (GIS). As shown in FIG. 1, multi-source imagery 100 can be collected for a real-world location. The multi-source imagery 100 can include imagery derived from aerial and satellite photography, electro-optical sensing, infrared and hyperspectral sensing, SAR and LIDAR imaging, and conventional handheld photography. Still, the invention is not limited to any particular source of imagery and any such source can suffice in accordance with the inventive arrangements.

Once obtained, the multi-source imagery 100 can be used to model the real world location using modeling techniques well-known in the art. In particular, geospatial positions within the model can be characterized according to latitudinal and longitudinal coordinates. Importantly, the geo-spatial positions also can be characterized according to altitude data 110. For instance, the latitudinal and longitudinal coordinates of a building in the model can be shared for each floor in the building, but each floor also can have associated therewith an altitude coordinate, thus providing a manner in which individual floors can be distinguished from one another. Furthermore, where an altitude component has been included for geo-spatial positions in the model, distances can be computed between positions at different altitudes.

As will be recognized by one skilled in the art, models can be built at varying resolutions ranging from untextured digital elevation models to full-color polygon models having high resolution textures. For instance, the RealSite™ modeling process developed by Harris Corporation of Melbourne, Fla. includes a three-step process for producing a model based upon multi-source imagery. First, a geometry extraction process can be applied to the source imagery to produce polygons. Second, the exacted polygons can be combined to produce a shaded model. Finally, automatic textures can be applied to the shaded polygons to produce the final geo-spatially accurate model.

Each of the latitudinal, longitudinal and altitude coordinates can be stored in a geo-spatial database 130 as primitive GIS entries in a volume imprint, referred to hereinafter as a "GIS VolPrint". In particular, each GIS VolPrint can include an ordered set of spatial coordinates such as latitude, longitude and altitude. Furthermore, shape constraints can be included as part of each GIS VolPrint. Preferably, the VolPrints can be stored in the geo-spatial database 130 using either helical hyperspatial codes (HH codes), or oct-trees, though the invention is not limited to any particular GIS VolPrint storage schema.

The GIS VolPrint, itself, can be processed into a suitable encoded format within the encoder 120 en route to the geo-spatial database 130. Once stored in the geospatial database 130, the collection of GIS VolPrints in the geo-spatial database 130 can be managed by a GIS database engine 140. Importantly, database operations and methods 150 can be defined for the storage, retrieval and indexing of the VolPrints stored in the geo-spatial database 130. The operations and methods 150 can include not only rudimentary access operations such as matching, adding and deleting, but also VolPrint specific operations such as distance, etc.

Importantly, as each of the HH codes and oct-trees are well-known concepts which have been incorporated within commercially available relational database engines, the operations and methods 150 can expand upon the HH code processing and oct-tree processing operations already included as part of the GIS database engine 140. Furthermore, to the extent that the GIS database engine 140 has been configured to process documents formatted in geography markup language (GML), the operations and methods 150 can be defined accordingly.

Figure 2:
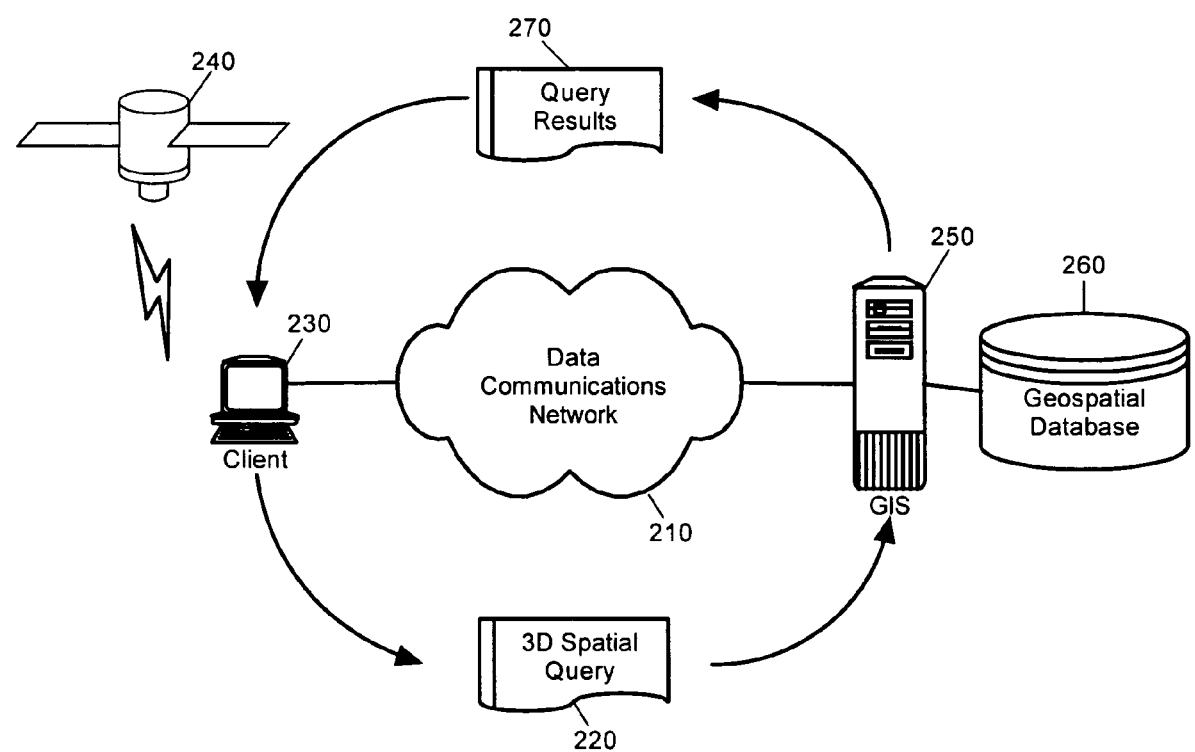

FIG. 2 is a schematic illustration of the operation of a GIS 250 which has been configured in accordance with the present invention. In particular, a client computing device 230 can be communicatively linked to the GIS 250, either directly, or through a data communications network 210. The client computing device 230 can be used merely as an operator's console through which 3D geo-spatial data in the geo-spatial database 260 can be processed, or as location-based terminal capable of initiating geo-spatial queries based upon positioning data provided by a positioning satellite 240. In either case, the client computing device 230 can issue a 3D geo-spatial query 220 against the geo-spatial database 260.

The GIS 250 can receive the 3D geo-spatial query 220 and can extract therefrom a referenced 3D position in a geo-spatially accurate 3D model. Using the extracted 3D position, the GIS 250 can select a suitable database operation for performing a direct query against the 3D geo-spatial data stored in the geo-spatial database. In response, Query Results 270 can be provided by the GIS 250. For instance, a 3D route can be computed and visualized according not only to latitudinal and longitudinal components, but also in respect to changes in altitude. Thus, an optimal route can be selected between two points in a geo-spatially accurate 3D model, taking into account, for instance, undesirable changes in road grade. Furthermore, the computed route can be transformed into a digital movie clip and played back in a vehicle at a frame rate which corresponds to vehicle velocity.

Notably, by configuring a 3D GIS to process pure volumetric geo-spatial queries, many advanced applications can be provided. For example, in response to reports of a gas leak in a high-rise office tower, a GPS-enabled client device in a fire truck communicatively linked to the 3D GIS system of the present invention not only can compute the quickest route to the high-rise office tower, but also all gas lines and shut-off valves within the high-rise office tower can be visualized in advance and, once on site, firefighters can be guided to the nearest escape routes based upon individual GPS receivers and a geo-spatially accurate 3D model of the high-rise office tower. Notably, the escape route scenario analogously can be applied to forest-fire operations in mountainous terrain.

As another example, an individual GPS receiver in a cave can provide a VolPrint which can be used in a 3D volumetric geo-spatial query of a cave model to identify documented cave openings within a prescribed distance of the GPS receiver. Similarly, the VolPrint can be used to identify all GPS receivers within a pre-scribed distance of a cave opening. Notably, neither application is possible using a two-dimensional geospatial query. Rather, as two-dimensional geo-spatial querying can only process latitudinal and longitudinal coordinates, cave openings at differing altitudes cannot be accurately distinguished from one another when computing a distance between a GPS receiver and any one cave opening.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A geographic information system for modeling real world locations comprising:
    a database of geo-spatial data derived from imagery of a real-world location, said database configured to store said geo-spatial data using three-dimensional coordinates, including an altitude coordinate;
    at least one database operation configured to process a database query against geo-spatial data stored in said database, said at least one database operation accepting three-dimensional coordinates as part of said database query, said at least one database operation being further configured to return a three-dimensional query result based upon said database query, and wherein said three dimensional query result includes an identification of at least one of a point, a line and an object that intersects a predetermined geo-spatial volume at any altitude within the geo-spatial volume; and,
    a geo-spatial data encoder configured to encode said geo-spatial data prior to said storing of said geo-spatial data in said database, said encoder comprising an oct-tree encoder.

2. The system of claim 1, further comprising a geography markup language (GML) formatter configured to format said query results using GML.

3. The system of claim 1, wherein said at least one database operation comprises a distance operation in which a distance between two points in a three-dimensional space can be computed in terms of two-dimensional distance and altitude.

4. The system of claim 1, wherein said at least one database operation comprises an intersection operation in which it can be determined whether a point in three-dimensional space intersects a volume defined in said database of geo-spatial data.

5. The system of claim 1, further comprising:
    a 3D visualization tool configured to generate a visual representation of said geo-spatial data in said database; and,
    a navigation system configured to compute a route between two geo-spatial data points in said database, said navigation system incorporating altitude data in computing said route.

6. The system of claim 5, further comprising a digital movie generator configured to convert a virtual reality tour of said route through a geo-spatially accurate volumetric model of an actual geographic location into a compressed digital movie which can be viewed in a digital movie player.

7. The system of claim 1, wherein said three dimensional query result includes an identification of a first location that exists at a specified altitude within a three dimensional object.

8. A method for configuring a geographic information system for modeling real world locations, comprising the steps of:
    capturing three-dimensional geo-spatial data based upon imagery of a real-world location, said captured three-dimensional geo-spatial data including an altitude coordinate, and forming a geo-spatially accurate model of said real-world location, including an identification of at least one of a point, a line and an object that intersects a predetermined geo-spatial volume at any altitude within the geo-spatial volume;
    using oct-tree codes for encoding said captured three-dimensional geo-spatial data for storage in a database;
    storing said encoded three-dimensional geo-spatial data in said database; and,
    configuring at least one database operation to execute a database query against said stored three-dimensional geo-spatial data based upon three-dimensional query input parameters.

9. The method of claim 8, wherein said identifying step further comprises identifying a location that exists at a specified altitude within a three-dimensional object.

* * * * *